(12) United States Patent
Valensa (10) Patent No.: US 8,663,851 B2
(45) Date of Patent: Mar. 4, 2014

(54) FUEL CELL SYSTEM WITH PARTIAL EXTERNAL REFORMING AND DIRECT INTERNAL REFORMING

(71) Applicant: Modine Manufacturing Company, Racine, WI (US)

(72) Inventor: Jeroen Valensa, Muskego, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 13/848,408

(22) Filed: Mar. 21, 2013

(65) Prior Publication Data

US 2013/0288145 A1    Oct. 31, 2013

Related U.S. Application Data

(62) Division of application No. 12/595,382, filed as application No. PCT/US2008/060557 on Apr. 17, 2008, now Pat. No. 8,409,758.

(60) Provisional application No. 60/923,885, filed on Apr. 17, 2007.

(51) Int. Cl.
*H01M 8/00* (2006.01)

(52) U.S. Cl.
USPC ........... 429/400; 429/408; 429/428; 429/434; 429/436; 429/479

(58) Field of Classification Search
USPC .................. 429/400, 408, 428, 434, 436, 479
See application file for complete search history.

(56) References Cited

U.S. PATENT DOCUMENTS

| 5,264,202 | A | 11/1993 | Snyder |
| 5,302,470 | A | 4/1994 | Okada et al. |
| 5,340,664 | A | 8/1994 | Hartvigsen |

(Continued)

FOREIGN PATENT DOCUMENTS

| EP | 0673074 | 8/1994 |
| JP | 10223236 | 8/1998 |

(Continued)

OTHER PUBLICATIONS

International Search Report and Written Opinion for Application No. PCT/US2008/060557 dated Jul. 24, 2008 (13 pages).

(Continued)

*Primary Examiner* — Jane Rhee
(74) *Attorney, Agent, or Firm* — Michael Best & Friedrich LLP (57) ABSTRACT

A fuel cell system includes a plurality of solid oxide fuel cells arranged in a fuel cell stack, an integrated heat exchanger/reformer operable to partially reform an anode feed prior to entry into the fuel cell stack, an anode tailgas oxidizer, and an offgas flow path extending away from an anode side of the fuel cell stack and having a first branch to selectively combine offgas from the anode side of the fuel cell stack with fuel from a fuel source to comprise the anode feed to the fuel cell stack and a second branch to supply offgas from the anode side of the fuel cell stack to the anode tailgas oxidizer. The integrated heat exchanger/reformer transfers heat from the oxidized offgas from the anode tailgas oxidizer to the anode feed before the anode feed enters the anode side of the fuel cell stack. The offgas from the anode tailgas oxidizer provides the sole heat source for the anode feed traveling through the integrated heat exchanger/reformer.

23 Claims, 6 Drawing Sheets

(56) References Cited

U.S. PATENT DOCUMENTS

| | | |
|---|---|---|
| 5,348,814 A | 9/1994 | Niikura et al. |
| 5,366,819 A | 11/1994 | Hartvigsen et al. |
| 5,470,670 A | 11/1995 | Yasamuta et al. |
| 5,763,114 A | 6/1998 | Khandkar et al. |
| 6,326,095 B1 | 12/2001 | Kneidel |
| 6,582,842 B1 | 6/2003 | King |
| 6,602,626 B1 | 8/2003 | Allen |
| 6,692,859 B2 | 2/2004 | Mukerjee et al. |
| 6,841,279 B1 | 1/2005 | Fober et al. |
| 6,844,100 B2 | 1/2005 | Bourgeois et al. |
| 6,921,596 B2 | 7/2005 | Kelly et al. |
| 6,951,697 B2 | 10/2005 | Stenersen |
| 6,974,644 B2 | 12/2005 | Blanchet et al. |
| 7,147,953 B2 | 12/2006 | Haltiner et al. |
| 7,169,495 B2 | 1/2007 | Pastula et al. |
| 2003/0044331 A1 | 3/2003 | DeBellis et al. |
| 2005/0164051 A1 | 7/2005 | Venkataramn et al. |
| 2008/0038622 A1 | 2/2008 | Valensa et al. |

FOREIGN PATENT DOCUMENTS

| | | |
|---|---|---|
| JP | 11031521 | 2/1999 |
| JP | 2002246047 | 8/2002 |
| JP | 2005019036 | 1/2005 |

OTHER PUBLICATIONS

International Search Report and Written Opinion for Application No. PCT/US2008/060594 dated Jul. 23, 2008 (5 pages).

FUEL CELL SYSTEM WITH PARTIAL EXTERNAL REFORMING AND DIRECT INTERNAL REFORMING

RELATED APPLICATIONS

This application is a divisional of co-pending U.S. patent application Ser. No. 12/595,382 filed on Feb. 10, 2010, which is a national stage entry of International Patent Application PCT/US08/60557 filed on Apr. 17, 2008, which claims priority to U.S. Provisional Patent Application No. 60/923,885 filed on Apr. 17, 2007, the contents of all of which are incorporated herein by reference.

FIELD OF THE INVENTION

The present invention relates to fuel cells, and in particular, to solid oxide fuel cells.

SUMMARY OF THE INVENTION

The fuel cell system of the present invention can have both partial external reforming and direct internal reforming means and the amount of direct internal reforming can be adjusted through a simplified control means and simplified flow routing.

The present invention can also or alternatively provide a fuel cell system capable of operation at high thermal efficiency levels.

The present invention can also or alternatively provide a process for rapidly starting a fuel cell system having both integrated partial external reforming and direct internal reforming means and for stably operating such a system at low power output levels.

In some embodiments, the present invention provides a fuel cell system comprising a plurality of solid oxide fuel cells arranged in one or more fuel cell stacks, a heat exchanger/reformer to preheat and partially reform the anode feed to the fuel cells, and an anode tailgas oxidizer (ATO) to provide a hot exhaust gas as the sole heat source for the heat exchanger/reformer, wherein the cooled anode offgas is split into a first portion to be oxidized in the ATO and a second portion to be recycled back to the fuel cell anodes, and wherein that portion of the fuel not reformed within the heat exchanger/reformer is direct internally reformed at the fuel cell anodes. The relative amount of direct internal reforming is controlled through varying the fuel utilization. Therefore, at high levels of fuel utilization, the percentage of fuel that is internally reformed is high, and at low levels of fuel utilization, the percentage of fuel that is internally reformed is low.

The invention also provides a fuel cell system including a plurality of solid oxide fuel cells arranged in a fuel cell stack, an integrated heat exchanger/reformer operable to partially reform an anode feed prior to entry into the fuel cell stack, an anode tailgas oxidizer, and an offgas flow path extending away from an anode side of the fuel cell stack and having a first branch to selectively combine offgas from the anode side of the fuel cell stack with fuel from a fuel source to comprise the anode feed to the fuel cell stack and a second branch to supply offgas from the anode side of the fuel cell stack to the anode tailgas oxidizer. The integrated heat exchanger/reformer transfers heat from the oxidized offgas from the anode tailgas oxidizer to the anode feed before the anode feed enters the anode side of the fuel cell stack. The offgas from the anode tailgas oxidizer provides the sole heat source for the anode feed traveling through the integrated heat exchanger/reformer.

In other embodiments, the invention provides a method of operating a fuel cell system. The method includes the acts of: providing a fuel cell stack including a plurality of solid oxide fuel cells, at least partially reforming an anode feed in an integrated heat exchanger/reformer, supplying the at least partially reformed anode feed to an anode side of the fuel cell stack, removing offgas from the anode side of the fuel cell stack along an offgas flow path, combining a first portion of offgas from the anode side of the fuel cell stack with the anode feed to recycle the offgas back to the fuel cell stack, supplying a second portion of offgas from the anode side of the fuel cell stack to an anode tailgas oxidizer, transferring heat from the oxidized offgas from the anode tailgas oxidizer to the anode feed in the integrated heat exchanger/reformer, and adjusting relative volumes of the anode feed reformed by the integrated heat exchanger/reformer and directly internally at the anode side of the stack by adjusting the heat content of the oxidized offgas.

In other embodiments, the invention provides a fuel cell system including a fuel cell stack having an anode side, an integrated reformer/heat exchanger, a first offgas flow path extending through a first pass of the integrated reformer/heat exchanger, and a second offgas flow path extending through a second pass of the integrated reformer/heat exchanger and in heat exchange relation with offgas flowing through the first offgas flow path. The second offgas flow path is operatively connected to the inlet of the anode side of the fuel cell stack downstream of the integrated reformer/heat exchanger to deliver an anode feed comprising recycled anode offgas to the anode side of the fuel cell stack. An upstream portion of the first offgas flow path is fluidly connected to an upstream portion of the second offgas flow path.

In other embodiments, the invention provides a method of operating a fuel cell system. The method includes the acts of operating the fuel cell according to a first mode of operation for starting the fuel cell system including directing offgas from an anode side of a fuel cell stack through compressor and a startup burner for preheating a cathode feed with the compressed and heated anode offgas, operating the fuel cell system according to a second mode of operation including directing offgas from the anode side of the fuel cell stack through an oxidizer and an integrated heat exchanger/reformer downstream of the oxidizer, and operating the fuel cell system according to a third mode of operation including recycling anode offgas through the anode side of the fuel cell stack.

The above and other features, aspects and advantages of the present invention will become apparent from a review of the detailed description and drawings.

Other aspects of the invention will become apparent by consideration of the detailed description and accompanying drawings.

DETAILED DESCRIPTION OF THE PREFERRED EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
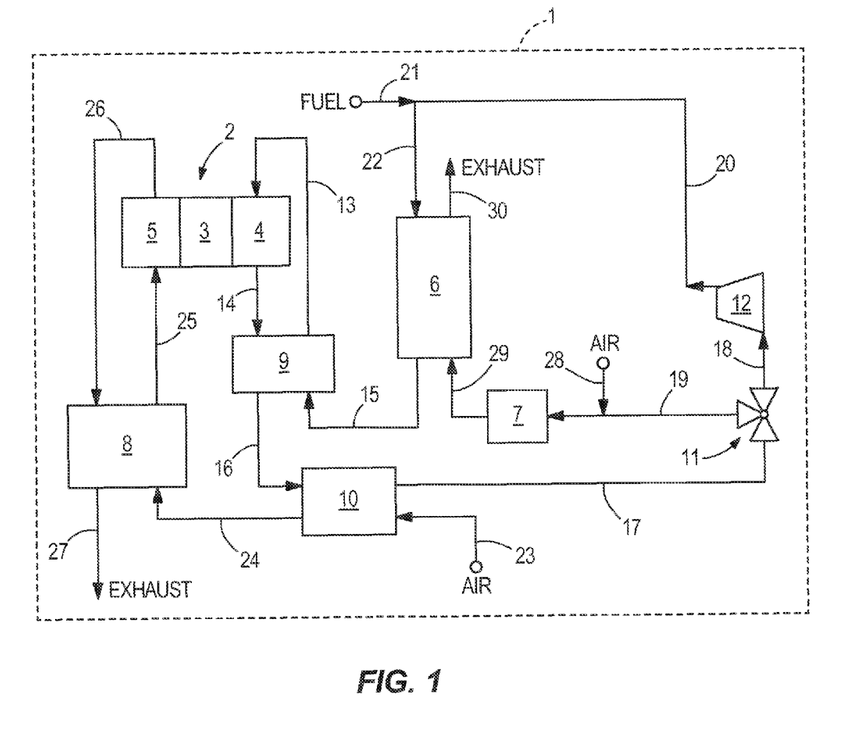
FIG. 1 is a diagrammatic representation of a portion of a fuel cell system embodying the present invention.

Relevant portions of a solid oxide fuel cell system 1 embodying the present invention are shown in FIG. 1. The fuel cell system 1 comprises a plurality of fuel cells 2, each fuel cell comprising a solid electrolyte 3 separating an anode 4 and a cathode 5. The fuel cell system 1 also comprises a heat exchanger/external reformer 6 and an anode tailgas oxidizer (ATO) 7. It should be understood that the term "external reformer" when used herein is not meant to imply that the device is external to or not integrated into the fuel cell system or any sub-part of the system, but is instead used to denote that the source of heat for the reforming reaction is not heat that is directly rejected from the stack to the reformer via conduction or radiation heat transfer, a mode of operation commonly referred to as "internal reforming". It will be shown later in the detailed description that the degree to which the fuel can be reformed within the heat exchanger/external reformer 6 is limited by the enthalpy content of a heating flowstream passing therethrough, and the device 6 will at times be referred to as a "Heat exchanger and Enthalpy Limited Partial External Reformer" (HELPER).

The embodiment of FIG. 1 is further comprised of a recuperative heat exchanger 9 for the anode flow, a recuperative heat exchanger 8 for the cathode flow, an air preheater/anode offgas cooler 10, an anode offgas recycle valve 11, and an anode recycle pressurization device 12 (e.g., a compressor, a venturi, etc.). Although these devices are all shown in the embodiment of FIG. 1, it should be appreciated that not all of these devices are required to be present in an embodiment of the invention and no limitation requiring the presence of any or all of these devices in the invention is intended.

In the embodiment of FIG. 1, an anode feed 22 comprised of a gaseous hydrocarbon fuel flow 21 and a pressurized recycled anode offgas flow 20 enters the HELPER 6. Within the HELPER 6, the flow 22 is heated to a temperature suitable for methane steam reforming, and some fraction of the hydrocarbon species in the flow 22 are reformed so that the flow exits the HELPER 6 as a reformate flow 15 comprised of methane, molecular hydrogen, water vapor, carbon monoxide and carbon dioxide, and free of any substantial concentration of hydrocarbons of a higher order than methane. The source of heat for the heating and reforming of the flow 22 is an ATO exhaust flow 29 that passes through the HELPER 6 in heat exchange relation with the flow 22, and exits the HELPER 6 as a cooled exhaust flow 30.

In the embodiment of FIG. 1, the reformate flow 15 next flows through the anode recuperative heat exchanger 9 and is further heated therein to a temperature that is compatible with the fuel cells, exiting as a fully heated reformate flow 13, which is routed to the fuel cell anodes 4. At the fuel cell anodes 4, the remaining hydrocarbons in the fully heated reformate flow 13 are directly internally reformed, and some fraction of the oxidizable fuel species is electrochemically oxidized by the oxygen ions transported through the electrolyte 3 from the cathode 5, thereby producing a flow of electrons from anode to cathode through an external electrical circuit connected to the fuel cell system 1. The rate at which oxygen ions are transported to the anode 4 as a percentage of the rate that would be required to fully oxidize the fuel delivered to the anode 4 by the heated reformate flow 13 is referred to as the anode utilization of the fuel cells.

As further illustrated in FIG. 1, the flow exits the anode as an anode offgas flow 14 and passes through the anode recuperative heat exchanger 9, wherein it rejects heat to reformate flow 15 and exits as a partially cooled anode offgas flow 16. The partially cooled anode offgas flow 16 next passes through the air preheater/anode offgas cooler 10, wherein it rejects heat to a fresh cathode air flow 23 and exits as a fully cooled anode offgas flow 17. The fully cooled anode offgas flow 17 enters an anode offgas recycle valve 11, wherein the flow is divided into a first portion 18 of the anode offgas flow 17 and a second portion 19 of the anode offgas flow 17. While reference is made herein to an anode offgas recycle valve 11, in some embodiments, the offgas can be divided and/or diverted using other flow control devices, including, but not limited to branching junction conduits and the like. The anode offgas recycle valve 11 can be any component or combination of components suitable for dividing the anode offgas flow 17. By way of example, the anode offgas recycle valve 11 may be comprised of a single metering valve, or it may be comprised of two mass flow controllers.

The first portion 18 of anode offgas enters the anode recycle pressurization device 12 and is elevated in pressure so that it is able to be combined with a fresh fuel flow 21 to comprise the anode feed 22 that is delivered to the HELPER 6. The second portion 19 of anode offgas is combined with an air flow 28 and is oxidized in the ATO 7 to produce the hot ATO exhaust flow 29. The ATO 7 in this embodiment can be a flame combustor, a catalytic combustor, or any other device with a similar function. The hot ATO exhaust 29 passes through the HELPER 6, rejecting heat to the anode feed 22 and exiting as a cooled ATO exhaust flow 30. The amount of air supplied to the ATO 7 is adjusted in order to control the temperature of the hot ATO exhaust 29 so as not to exceed the maximum temperature limitation of the HELPER 6. In some embodiments, it may be preferable to further cool the non-recycled portion 19 of the anode offgas in order to condense out the water vapor from the flow prior to combining the flow with the oxidizing air flow 28.

Turning now to the cathode flow in the embodiment shown in FIG. 1, the fresh cathode air 23 is heated in the air preheater/anode offgas cooler 10 by the partially cooled anode offgas flow 16, exiting as a partially heated fresh cathode air flow 24. This flow then passes through the recuperative heat exchanger 8, wherein it is heated to a temperature that is compatible with the fuel cells and exiting as a fully heated fresh cathode air flow 25. The fully heated fresh cathode air flow 25 is routed to the fuel cell cathodes 5, where the cathode reaction reduces molecular oxygen in the air flow to oxide ions which are then transported through the electrolyte 3 to the anode 4. The flow provides some convective cooling of the fuel cells 2 and leaves the cathodes as a cathode exhaust flow 26 at a temperature exceeding that of the cathode inlet flow 25. The cathode exhaust flow 26 passes through the recuperative heat exchanger 8, wherein it rejects heat to the partially heated fresh cathode air flow 24 and exiting as a cooled exhaust flow 27.

The embodiment as described above is able to achieve the stated objective of providing the capability to adjust the amount of internal reforming through simplified control means by the use of the HELPER. Since the heat source for the HELPER is comprised of the unrecycled anode offgas, the amount of enthalpy available to be recaptured in the HELPER can be adjusted by varying the fuel utilization in the fuel cells, the percentage of anode offgas recycle, or both. In practice, it is important to maintain a sufficient concentration of water vapor in the anode feed relative to the concentration of oxidizable carbon species (a ratio commonly referred to as the "steam-to-carbon" ratio), and this is typically maintained (in an anode recycle system) by recycling an appropriate percentage of the anode offgas, typically in the range of 50-60%. Consequently, in some embodiments, it may be preferable to set the anode recycle percentage to a fixed value and to control the enthalpy made available to the HELPER by varying the fuel utilization alone. Fuel utilization is controlled by adjusting the rate at which the fuel is added to the anode feed, in relation to the electrical power that is drawn from the fuel cell system.

When fuel utilization is relatively high, the amount of combustible species in the unrecycled anode offgas flow is relatively low. As a result, the enthalpy made available to the HELPER is also relatively low, limiting the degree to which the anode feed can be preheated and partially reformed. This leads to a greater amount of direct internal reforming that must be performed on the anodes. Several advantages are readily apparent when the system is operating in this mode. First, the thermal efficiency of the system can be maximized by minimizing the rate of fuel addition required for a given electrical output. Second, the amount of stack cooling due to direct internal reforming can be maximized, thereby reducing the amount of excess cathode air required for stack cooling, which decreases the large parasitic losses due to the cathode air mover.

A further advantage over the prior art, in which a portion of anode feed bypasses an indirect internal reformer, is that all of the anode feed passes through the HELPER. When the fuel is a natural gas fuel comprised primarily of methane with small percentages of higher hydrocarbons, the HELPER can perform the added function of pre-reforming the higher hydrocarbons. Pre-reforming is an adiabatic process wherein water vapor is used to convert higher hydrocarbons to methane, hydrogen, carbon monoxide and carbon dioxide. By not having any of the anode feed bypassing the reforming catalyst prior to reaching the fuel cell anodes, the risk of anode coking by higher hydrocarbons is greatly reduced.

In some circumstances, it may be preferable to not operate with a high degree of internal reforming. The embodiment as described provides the capability of reducing the amount of internal reforming by decreasing the fuel utilization. When fuel utilization is decreased, the amount of heat value in the unrecycled anode offgas increases, thereby providing more enthalpy to the HELPER. This has the effect of increasing the percentage of fuel that is reformed in the HELPER and decreasing the percentage that must be internally reformed.

Many suitable construction types for the HELPER can be contemplated, including, but not limited to a bar-plate heat exchanger construction in which heat exchange surfaces for the anode feed are coated with a reforming catalyst, a plate fin heat exchanger construction in which heat exchange surfaces for the anode feed are coated with a reforming catalyst, a concentric annular construction comprised of a metal cylinder, a first convoluted fin structure metallurgically bonded to the inner surface of the cylinder around the entire circumference, a second convoluted fin structure metallurgically bonded to the outer surface of the cylinder around the entire circumference, and a reforming catalyst coating on one of the first and second convoluted fin structures, and the like. It should be appreciated that the construction selected for the HELPER will be highly dependent upon the requirements of each application and the construction selected is not critical to the invention.

Figure 2:
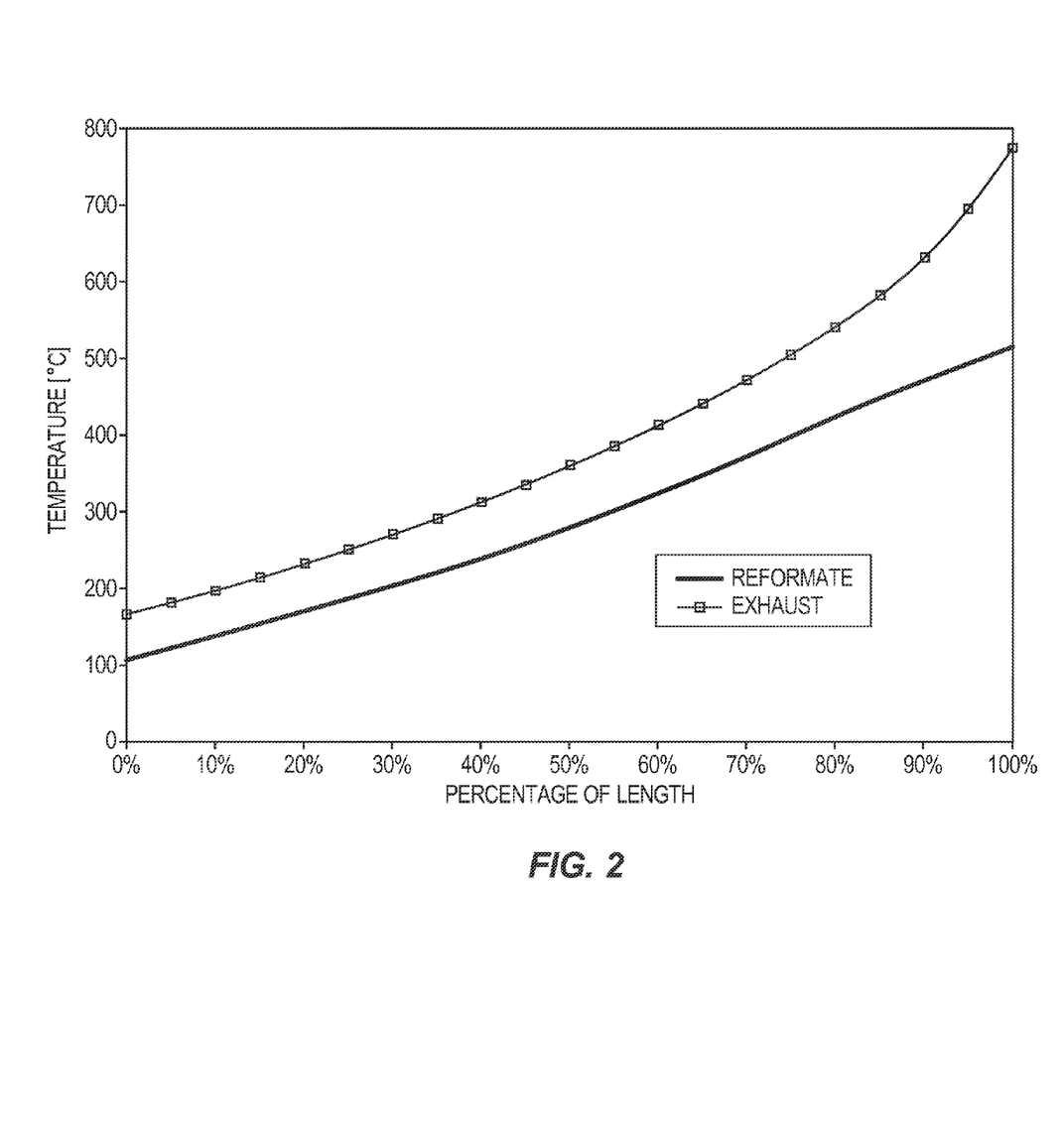
FIG. 2 is a graph illustrating the temperature profiles of an anode feed flow and an exhaust flow in a heat exchanger/external reformer in a fuel cell system embodying the present invention, as calculated in an analysis of the fuel cell system at one operating condition.
Figure 3:
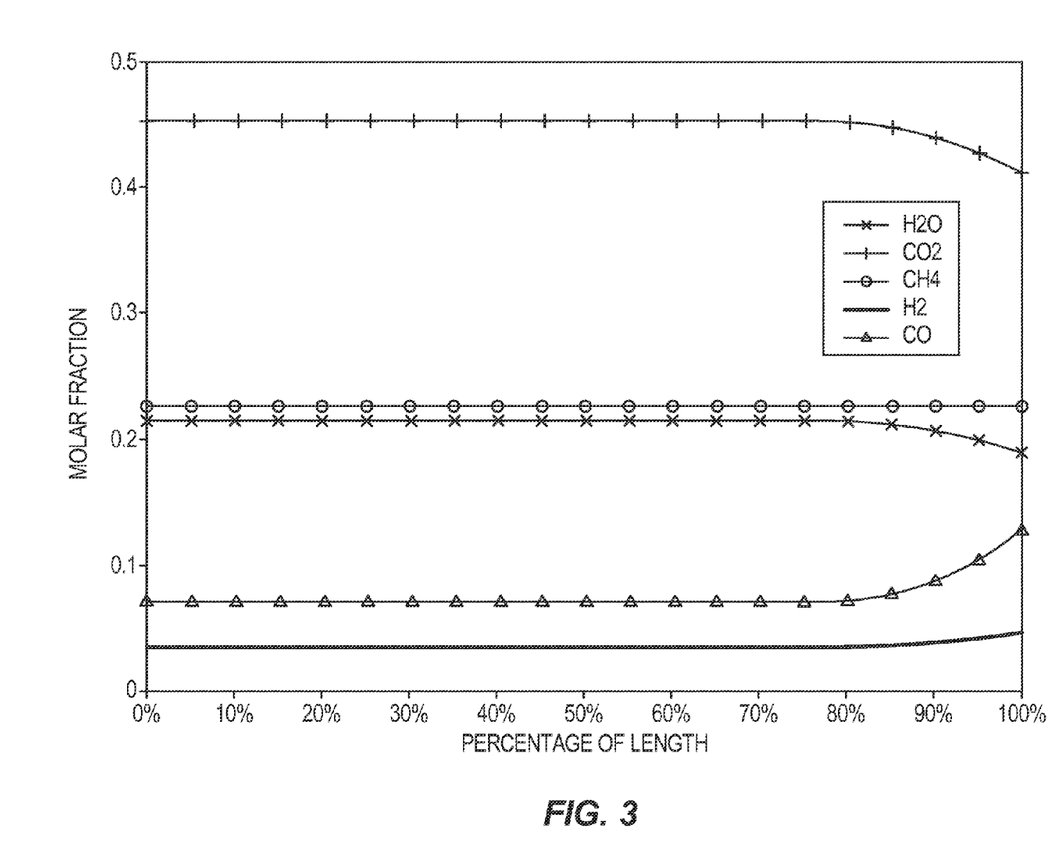
FIG. 3 is a graph illustrating the anode feed flow composition along the length of the heat exchanger/external reformer from the same system analysis as the graph of FIG. 2.

In one example analyzed by the inventor, it was assumed that, the fuel cells were operating at 820° C. with 80% fuel utilization and a cell voltage of 735 mV, the fuel consisted of methane at 20° C., and that the percentage of anode offgas recycled was 55%. The analysis of the fuel cell system showed that 92% of the methane fuel would need to be directly internally reformed, that the cathode air flow required for proper cooling of the fuel cells would need to be 3.55 times the stoichiometric airflow, and that the calculated thermal efficiency of the fuel cells was 63.5% based on the lower heating value of methane. The calculated temperature profiles of the fluids passing through the HELPER are illustrated in FIG. 2. It is evident from the low exhaust outlet temperature in FIG. 2 that almost all of the enthalpy available in the exhaust stream has been recovered. It is also evident in FIG. 2 that the anode feed has been heated from an inlet temperature of approximately 100° C. to an outlet temperature of approximately 510° C. FIG. 3 illustrates the calculated molar fractions of the different species comprising the anode feed flow along the length of the HELPER. FIG. 3 illustrates that substantially no chemical reactions occur over the first 80% of the HELPER. This effect is due to the temperature dependency of the reforming reaction kinetics. However, FIG. 3 does illustrate that the HELPER is capable of heating the anode feed to a temperature where some (approximately 8%) of the methane can be reformed.

Figure 4:
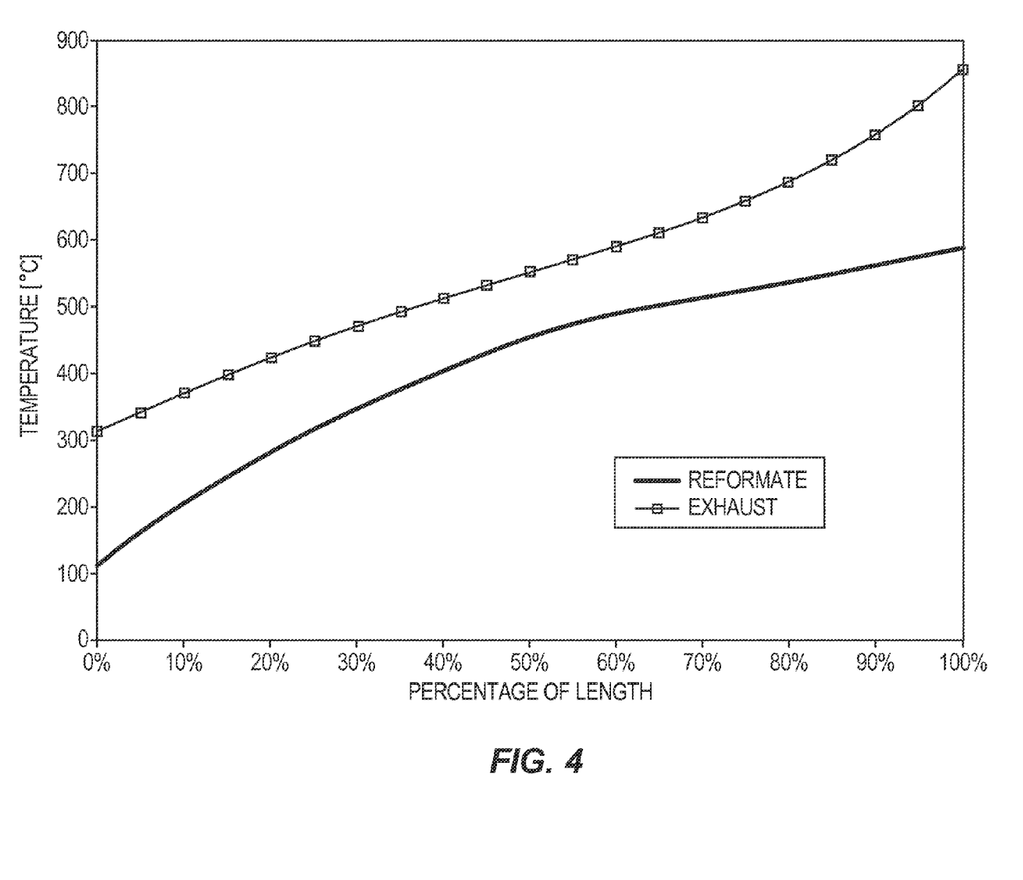
FIG. 4 is a graph of FIG. 2 but at another operating condition.
Figure 5:
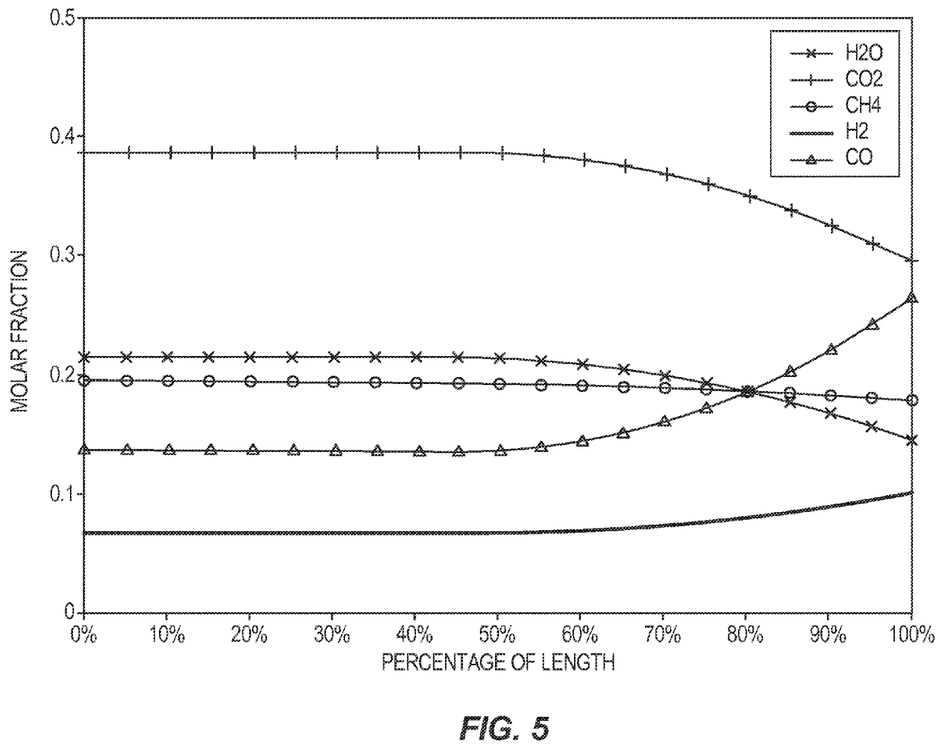
FIG. 5 is a graph of FIG. 3 but at the operating condition of FIG. 4.

The analysis was repeated with the fuel utilization reduced to 65%. Under these operating conditions, the analysis of the fuel cell system showed that 76% of the methane fuel would need to be directly internally reformed, the cathode air flow required for proper cooling of the fuel cells would need to be 3.87 times the stoichiometric airflow, and that the calculated thermal efficiency of the fuel cells was 56.8% based on the lower heating value of methane. It should be appreciated that the calculated amount of direct internal reforming required of the fuel cell anodes was substantially reduced, with a slight increase in the amount of cathode air required and a slight decrease in the fuel cell thermal efficiency, by decreasing the fuel utilization. The calculated temperature profiles of the fluids passing through the HELPER for this analysis are illustrated in FIG. 4. FIG. 4 illustrates that the minimum temperature approach between the two fluids is no longer at the cold end of the HELPER, but is instead located near the center of the length. As a result, the exhaust stream exits at a higher temperature than in the first analysis and the amount of unrecovered enthalpy is somewhat higher. However, the greater enthalpic value of the exhaust stream results in a higher exit temperature (approximately 590° C.) for the anode feed stream. FIG. 5 illustrates the calculated molar fractions of the different species comprising the anode feed flow along the length of the HELPER for this analysis. It can be seen that the reforming reactions start significantly sooner than in the previous analysis, at approximately 50% of the length, and that significantly more of the methane is reformed.

Figure 6:
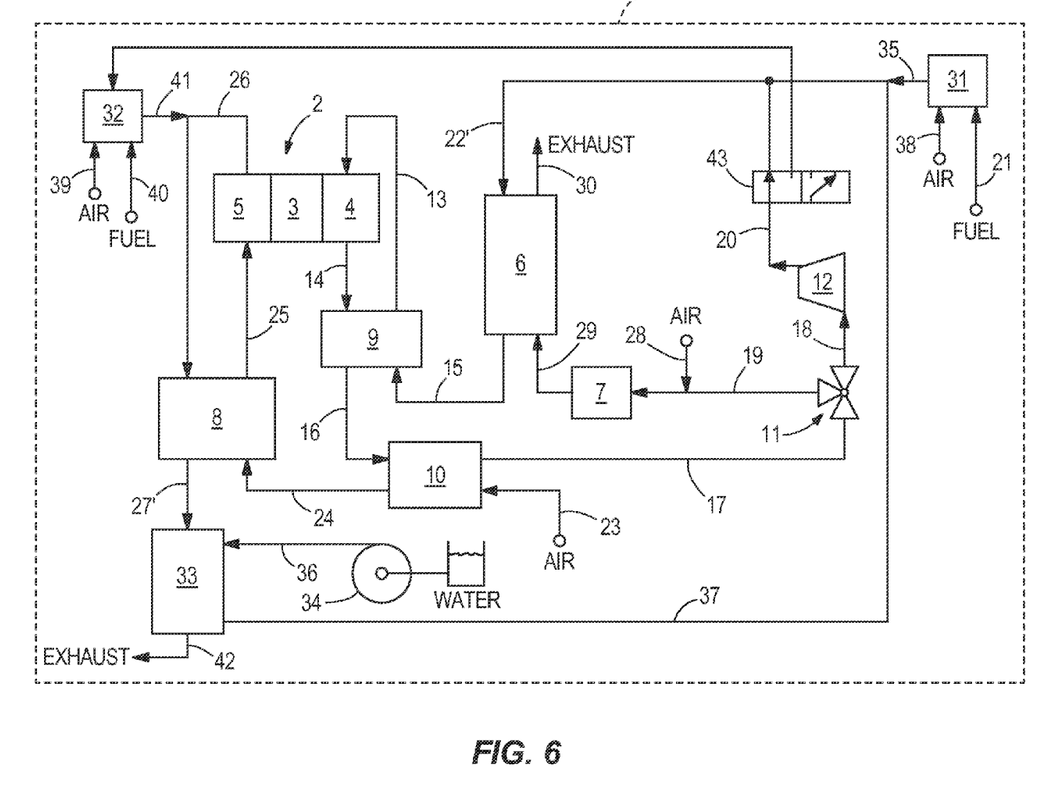
FIG. 6 is a diagrammatic representation of a portion of a fuel cell system embodying the present invention similar to FIG. 1 but showing additional aspects.

FIG. 6 illustrates an embodiment of the present invention comprising all of the aspects of the embodiment shown in FIG. 1 and further comprising additional features that enable both rapid startup of the fuel cell system and stable operation at low power output levels, thereby satisfying another object of the invention. Functionally identical components and flowstreams to those in the embodiment illustrated in FIG. 1 are identified with like reference numerals. Functionally similar but not identical flowstreams are identified with like reference numerals, with such numerals in FIG. 6 being followed by a prime modifier.

The embodiment of the fuel cell system 1 illustrated in FIG. 6 includes a startup reformer 31 that can be used to produce a reformate stream 35 through partial oxidation of the fuel 21 and an air flow 38. The reformate stream 35 is comprised of nitrogen, hydrogen, carbon monoxide, carbon dioxide and water vapor. It is well-known as beneficial for the fuel cell anodes to be exposed to a reducing environment during startup. In the embodiment illustrated in FIG. 6, the outlet of the startup reformer 31 is operatively connected to the anode feed inlet of the HELPER 6, so that during startup, the anode feed to the HELPER 22' is comprised of the reducing reformate stream 35. In this manner, the anodes can be exposed to a reducing environment during startup. It should be appreciated that the primary purpose of the startup reformer 31 is to provide the anodes with a reducing environment, and consequently there is no need for the startup reformer 31 to be of a size suitable for producing reformate at such a rate as is necessary for the production of any amount of electricity by the fuel cells.

The embodiment illustrated in FIG. 6 further includes a start burner 32, a water pump 34, and a steam generator 33. The start burner 32 produces a hot exhaust flow 41 that combines with the cathode exhaust flow 26. In this embodiment, the recuperative heat exchanger 8 receives the combined startup burner exhaust 41 and cathode exhaust 26 and transfers heat from this flow to the incoming cathode air 24, so that the combined startup burner exhaust 41 and cathode exhaust 26 exit the heat exchanger 8 as the exhaust flow 27'. The exhaust flow 27' passes through the steam generator 33, wherein it rejects heat to a water flow 36 provided by the water pump 34, the exhaust flow 27' exiting the steam generator 33 as a cooled exhaust flow 42 and the water flow 36 exiting the steam generator 33 as a superheated steam flow 37. The steam flow 37 is connected into the anode supply piping so that the anode feed 22' comprises the steam flow 37 when water is supplied by the water pump 34.

FIG. 6 further illustrates a two-position three-way valve 43 with a first port operatively connected to receive the pressurized anode recycle flow 20, a second port operatively connected to the anode feed inlet of the HELPER 6, a third port operatively connected to start burner 32, a first position that directs flow from the first port to the second port, and a second position that directs flow from the first port to the third port.

The invention contemplates a method of the starting the fuel cell system 1 in the embodiment illustrated in FIG. 6, the method comprising the steps of:

1. providing an air flow 23;
2. providing a reducing reformate flow 35 comprised of a fuel flow 21 and an air flow 38;
3. setting the anode offgas recycle valve 11 so that all of the anode offgas 17 is diverted to the recycle pressurization device 12 as a recycled anode offgas 18, and flowing the pressurized recycled anode offgas 20 through the two-position three-way valve 43, the valve 43 set to a position that directs the recycled anode offgas 20 to the start burner 32;
4. igniting the start burner 32 to combust the recycled anode offgas 20 using a start burner air flow 39, the exhaust 41 from the start burner 32 being used to provide a heated cathode air flow 25 in order to heat the fuel cells 2;
5. adding a fuel flow 40 to the start burner 32 in order to provide a greater flow of exhaust 41,
6. setting the anode offgas recycle valve 11 so that some of the anode offgas 17 is diverted to the ATO 7 as a non-recycled anode offgas flow 19, providing an ATO air flow 28 to the ATO 7 and combusting the non-recycled anode offgas flow 19 with the ATO air flow 28 in the ATO 7 to direct an ATO exhaust flow 29 to the HELPER 6;
7. providing a water flow 36 to the steam generator 33 to produce a superheated steam flow 37;
8. turning off the air flow 38 to the startup reformer 31 so that the anode feed flow 22' is comprised of the steam flow 37 and the fuel flow 21, and using the heat from the ATO exhaust 29 to reform a portion of the fuel 21 in the HELPER 6;
9. setting the two-position three-way valve 43 to a position that directs the recycled anode offgas 20 to the HELPER 6;
10. producing an electrical current flow from the fuel cells 2;
11. turning off the water flow 36; and
12. turning off the air flow 39 and the fuel flow 40 to the start burner 32.

The embodiment as described is also capable of operating at low power output conditions. Since the heat for the reformer is not derived from the heat produced by the fuel cell reactions within the stack, but is rather derived from the heating value of the anode offgas, it becomes possible to operate the fuel cell system 1 at a low power output and a low fuel utilization, thereby providing a greater amount of enthalpy to the HELPER 6 by way of the ATO exhaust 29 and externally reforming a relatively large percentage of the anode feed in the HELPER.

The embodiments described above and illustrated in the figures are presented by way of example only and are not intended as a limitation upon the concepts and principles of the present invention. As such, it will be appreciated by one having ordinary skill in the art that various changes are possible.

What is claimed is:

1. A method of operating a fuel cell system, the method comprising the acts of:
   providing a fuel cell stack including a plurality of solid oxide fuel cells;
   at least partially reforming an anode feed in an integrated heat exchanger/reformer;
   supplying the at least partially reformed anode feed to an anode side of the fuel cell stack;
   removing offgas from the anode side of the fuel cell stack along an offgas flow path;
   combining a first portion of offgas from the anode side of the fuel cell stack with the anode feed to recycle the offgas back to the fuel cell stack;
   supplying a second portion of offgas from the anode side of the fuel cell stack to an anode tailgas oxidizer;
   transferring heat from the oxidized offgas from the anode tailgas oxidizer to the anode feed in the integrated heat exchanger/reformer; and adjusting relative volumes of the anode feed reformed by the integrated heat exchanger/reformer and directly internally at the anode side of the stack by adjusting the heat content of the oxidized offgas.

2. The method of claim 1, further comprising adjusting a rate at which fuel is added to the anode feed to control a fuel utilization of the stack.

3. The method of claim 1, further comprising adjusting a ratio of the first portion of offgas to the second portion of the offgas to adjust the heat content of the oxidized offgass.

4. The method of claim 1, further comprising adjusting the heat content of the oxidized offgass by varying the fuel utilization of the system.

5. The method of claim 1, further comprising elevating a pressure of at least a portion of the offgas from the anode side of the fuel cell stack prior to recycling the offgas through the fuel cell stack.

6. The method of claim 5, further comprising elevating a pressure of the first portion of offgas prior to directing the offgas through the integrated heat exchanger/reformer.

7. The method of claim 1, further comprising providing a heat exchanger positioned along the offgas flow path transferring heat from the offgas of the anode side of the fuel cell stack to the anode feed downstream of the integrated heat exchanger/reformer.

8. The method of claim 1, further comprising providing a reformate stream wherein the anode feed includes at least a portion of the reformate stream.

9. The method of claim 8, wherein the act of providing the reformate stream includes providing the reformate stream to the first portion of offgas upstream of the integrated heat exchanger/reformer.

10. The method of claim 1, further comprising providing a steam generator fluidly connected to the offgas flow path for providing a steam flow.

11. The method of claim 10, further comprising providing the steam flow to the first portion of offgas flow path upstream of the integrated heat exchanger/reformer.

12. The method of claim 1, further comprising removing offgas from a cathode side of the fuel cell stack along a second offgas flow path.

13. The method of claim 1, further comprising
positioning a valve along a flow of the first portion of offgas,
providing a startup burner fluidly connected to the second offgas flow path, and
selectively directing offgas with the valve from the anode side of the fuel cell stack to one of the startup burner and the integrated heat exchanger/reformer.

14. The method of claim 13, further comprising transferring heat from a combined flow of an exhaust generated by the startup burner and the offgas from the cathode side of the fuel cell stack to a cathode feed.

15. The method of claim 12, further comprising transferring heat from the second offgas flow path to a cathode feed.

16. The method of claim 12, further comprising transferring heat from the second offgas flow path to a steam generator fluidly connected to the offgas flow path for providing a steam flow.

17. A fuel cell system comprising:
a fuel cell stack having an anode side;
an integrated reformer/heat exchanger;
a first offgas flow path extending through a first pass of the integrated reformer/heat exchanger; and
a second offgas flow path extending through a second pass of the integrated reformer/heat exchanger and in heat exchange relation with offgas flowing through the first offgas flow path;
wherein the second offgas flow path is operatively connected to the inlet of the anode side of the fuel cell stack downstream of the integrated reformer/heat exchanger to deliver an anode feed comprising recycled anode offgas to the anode side of the fuel cell stack, and
wherein an upstream portion of the first offgas flow path is fluidly connected to an upstream portion of the second offgas flow path.

18. The fuel cell system of claim 17, further comprising an oxidizer positioned upstream of the integrated reformer/heat exchanger along the first offgas flow path.

19. The fuel cell system of claim 17, further comprising a valve positioned along the second offgas flow path to selectively direct offgas from the anode side of the fuel cell stack to one of the first pass of the integrated reformer/heat exchanger and a startup burner.

20. The fuel cell system of claim 19, wherein the startup burner is operable to receive offgas from the valve and generate an exhaust flow to preheat a cathode feed.

21. The fuel cell system of claim 17, further comprising a third offgas flow path operatively connected to the outlet of a cathode side of the fuel cell stack, the third offgas flow path extending through a third pass of a heat exchanger to preheat a cathode feed.

22. The fuel cell system of claim 21, further comprising a steam generator positioned along the third offgas flow path, the steam generator includes a fourth pass for water flow and a fifth pass in heat connection with the fourth pass and fluidly connected to the third offgas flow path to allow offgas from the cathode side of the fuel cell stack therethrough.

23. The fuel cell system of claim 22, wherein the steam generator is operable to generate a steam flow and deliver the steam flow to the second offgas flow path upstream of the integrated reformer/heat exchanger.

* * * * *